United States Patent [19]

Leppek et al.

[11] Patent Number: 4,917,445

[45] Date of Patent: Apr. 17, 1990

[54] ABS VARIANT NOMINAL HOLD PRESSURE

[75] Inventors: Kevin G. Leppek, W. Bloomfield; Alex Kade, Grosse Pointe Woods; Allen J. Walenty, Utica, all of Mich.

[73] Assignee: General Motors Corporation, Detroit, Mich.

[21] Appl. No.: 322,138

[22] Filed: Mar. 13, 1989

[51] Int. Cl.⁴ .................... B60T 8/58; B60T 8/60
[52] U.S. Cl. .................... 303/100; 303/103; 303/DIG. 4; 303/115
[58] Field of Search .......... 303/95, 100, 103, 104, 303/110, 111, 115, DIG. 3, DIG. 4; 188/181 A, 181 C; 364/426.02

[56] References Cited

U.S. PATENT DOCUMENTS

| | | | |
|---|---|---|---|
| 3,953,083 | 4/1976 | Latvala et al. | 303/100 |
| 4,111,497 | 9/1978 | Carp et al. | 303/103 X |
| 4,209,203 | 6/1980 | Brearley | 303/103 X |
| 4,647,115 | 3/1987 | Leiber et al. | 303/DIG. 4 X |
| 4,664,453 | 5/1987 | Kade et al. | 303/100 |
| 4,741,580 | 5/1988 | Matsubura et al. | 364/426.02 X |
| 4,749,239 | 6/1988 | Onogi et al. | 303/100 X |

FOREIGN PATENT DOCUMENTS 0966209 4/1975 Canada .................... 303/DIG. 4

Primary Examiner—Andres Kashnikow
Assistant Examiner—Timothy Newholm
Attorney, Agent, or Firm—Howard N. Conkey

[57] ABSTRACT

A brake control system is described that maximizes the braking efficiency of an under-damped actuator, such as a motor-driven linear screw. When an incipient lock condition is detected, the system determines the optimal brake pressure, relieves brake pressure and measures the duration of the pressure release. When the wheel is approaching recovery, but has not yet substantially recovered, the system holds brake pressure constant at a value calculated to represent the amount of pressure remaining at the wheel brake. This calculated hold value is based upon the measured optimal pressure and the measured release duration, and allows the wheel to continue to reaccelerate towards recovery while preventing unnecessary pressure relief. Once the wheel recovers, the system reapplies brake pressure to a substantial fraction of the optimal pressure without over-exciting the actuator and over-shooting the desired pressure.

4 Claims, 4 Drawing Sheets

ABS VARIANT NOMINAL HOLD PRESSURE

BACKGROUND OF THE INVENTION

This invention relates to an antilock control system for vehicle wheel brakes.

When the brakes of a vehicle are applied, a braking force between the wheel and the road surface is generated that is dependent upon various parameters which include the road surface conditions and the amount of slip between the wheel and the road surface. The braking force increases as slip increases, until a critical value of slip is surpassed. Beyond this critical slip value, the braking force decreases and the wheel rapidly approaches lockup. If the wheel is allowed to lock, unstable braking occurs, and vehicle stopping distance on nondeformable surfaces increases. Thus, stable vehicle braking occurs when wheel slip does not exceed this critical slip value. An antilock control system achieves stable braking and minimizes stopping distance by cycling brake pressure such that braking force is maximized. This is accomplished by first detecting an incipient wheel lock condition, which indicates braking force has peaked and is now decreasing. One criteria that is used to indicate incipient wheel lock is excessive wheel deceleration and/or excessive wheel slip. Once an incipient wheel lock has been detected, pressure is relieved at the wheel brake. Upon releasing the brake pressure, the wheel accelerates and begins approaching recovery. The wheel is later said to be recovered when wheel slip is reduced to a value below the critical slip value. When the wheel has substantially recovered, brake pressure is reapplied. Reapplication of brake pressure results in the wheel again approaching lockup and the wheel cycle process is repeated.

In terms of the critical parameters of wheel slip and acceleration, the wheel cycle can be better described as follows: (a) the wheel is forced to decelerate and wheel slip increases until (b) the critical slip value is surpassed, at which point (c) an incipient lock condition is detected. Upon detecting the incipient lock, the wheel is allowed to begin reaccelerating. As (d) the wheel continues to accelerate, slip decreases, until (e) the wheel slip falls below the critical slip value. The wheel having substantially recovered, it is then forced to decelerate again, and the wheel cycle process repeats, returning to step (a). To achieve this wheel cycle, wheel brake pressure is increased during steps (a) and (b), is released during step (c), and is increased again after step (e). During step (d), when the wheel is accelerating and wheel slip is decreasing, it is not always necessary to continue relieving pressure as in step (c), yet the wheel is still too unstable to proceed to increase pressure as is done after step (e). This is due to the fact that, although the wheel is accelerating and approaching recovery, wheel slip is still above the critical slip value. Thus the wheel is operating in the region characterized by unstable braking. But the wheel is also approaching stability because wheel slip is decreasing. Therefore, in this region where the wheel is still operating in the unstable region and is approaching recovery (i.e. approaching stability), it is desirable to maintain pressure at a value that, while allowing the wheel to continue recovering, will avoid unnecessary pressure decrease. This state is called a "hold". The complete wheel pressure cycle can now be described as follows: wheel brake pressure increases, which (a) forces the wheel to decelerate and increases wheel slip until (b) the critical slip value is surpassed, at which point (c) an incipient lock condition is detected. Upon detecting the incipient lock, the wheel brake pressure is released, which allows the wheel to begin reaccelerating. As (d) the wheel continues to accelerate, slip decreases, at which point pressure is held constant to prevent unnecessary pressure loss. Once (e) the wheel slip falls below the critical slip value, the wheel has substantially recovered. Pressure is reapplied, the wheel is forced to decelerate again, and the wheel cycle process repeats, returning to step (a).

It should also be briefly noted that braking efficiency is maximized when the amount of time spent braking while wheel slip is at or near the critical slip value is maximized. This means that pressure should be released only enough to allow the wheel to return to the stable braking region, and, once operating in the stable region, pressure should be reapplied to a significant fraction of the pressure required to produce critical wheel slip. In doing so, the amount of time spent at or near the critical wheel slip is maximized.

To achieve linearity of control, antilock control systems have been known to utilize a motor driven piston actuator as opposed to a solenoid modulated actuator. Both mechanizations allow for the application, relief and holding of pressure, but the motor driven actuator has several advantages. First, the motor driven system controls pressure in a continuous rather than discrete fashion. Secondly, the motor driven mechanization, because of the relationship between motor torque and piston head pressure, provides information regarding wheel brake pressure without the addition of an external device such as a pressure transducer. Thus, while most antilock control systems execute wheel cycle control based upon vehicle motion parameters such as wheel slip and acceleration, the motor driven systems are automatically afforded the additional parameter of measured brake pressure.

However, the inertial characteristics of a motor driven actuator create an antilock control system which is under-damped. These inertial characteristics can be better understood by realizing the following dynamic relationships: (a) when the motor load (i.e. the pressure present on the piston head) is equal to the motor torque, the motor does not rotate and the piston remains stationary. Conversely, (b) when the motor load is small compared to the motor torque, the motor rotates at a high rate and the piston travels at a high speed. Because the objective of antilock control is to cycle the brake pressure closely about the pressure required to produce critical wheel slip, (c) optimal control is achieved when the piston moves slowly, which increases pressure gradually. Thus, (d) if the motor torque is significantly greater than the pressure present at the piston head (i.e. the motor load), the piston moves too rapidly to produce the desired pressure control, the system becomes over-excited and overshoots the desired pressure. Therefore, care must be taken in the control of a motor driven actuator to avoid situations in which the actual wheel brake pressure is substantially lower than the desired wheel brake pressure.

As a by-product of controlling the antilock control system such that inertial overshoot is avoided, several additional advantages can be realized. First, by avoiding the over-release situation, braking efficiency is increased. This result is two-fold: (1) because minimum brake pressure is maintained at a level higher than would be realized if an over-release condition was in existence, and (2) because brake pressure does not subsequently overshoot the desired pressure, the minimum brake force does not vary as greatly from the optimum brake force for the surface. Secondly, by avoiding unnecessary pressure release, the amount of time spent by the system in reaching the optimum brake pressure for the road surface is minimized. These advantages result in higher braking efficiency. Furthermore, when braking efficiency is maximized, the "vehicle surging" effect felt by the driver is minimized. This surging sensation is created by large changes in vehicle deceleration. By maintaining braking efficiency, the deceleration of the vehicle is more consistent, thereby creating a more pleasant vehicle braking sensation for the driver.

SUMMARY OF THE INVENTION

To effect the three antilock control states of apply, release and hold, the motor driven linear screw actuator must be commanded in a fashion such that it is not over-excited, otherwise the system will exceed the desired pressure. By utilizing the characteristics of this invention, which provides for the holding of wheel brake pressure at a calculated value while the wheel is approaching recovery, effective wheel cycle control can be achieved. This invention maintains a constant wheel brake pressure which is calculated to be sufficiently low to permit the wheel to recover, yet is sufficiently high to prevent over-release of pressure. Thus, the hold state described by this invention allows wheel slip to continue to decrease, but does not compromise wheel stability by increasing pressure while the wheel is operating in the unstable region. Also, in avoiding the over-release condition, the linear screw actuator is not over-excited when reapplying.

The invention accomplishes this by measuring instantaneous wheel brake pressure once an incipient lock condition has been detected. The instantaneous pressure value is stored as a reference pressure which represents the maximum pressure achieved during the current wheel cycle. Having determined that the wheel is approaching a locked condition, the invention commands the motor to release wheel brake pressure. As brake pressure is released to remedy the incipient lock condition, the invention measures the duration of the release. Using this measured duration, the amount of pressure that was released during the measured period is estimated. The estimated value is subtracted from the reference pressure, and this different result is then factored for the compliance characteristics of the wheel brake to arrive at the calculated value for the pressure remaining at the wheel brake. The motor is then commanded to deliver the torque necessary to hold wheel pressure constant at the calculated hold value. The invention will maintain this hold value as long as the wheel continues to approach recovery while operating in the unstable braking region.

DESCRIPTION OF THE DRAWINGS

The invention may be best understood by referencing the following description of the preferred embodiment and the drawings in which.

DESCRIPTION OF THE PREFERRED EMBODIMENT

Figure 1:
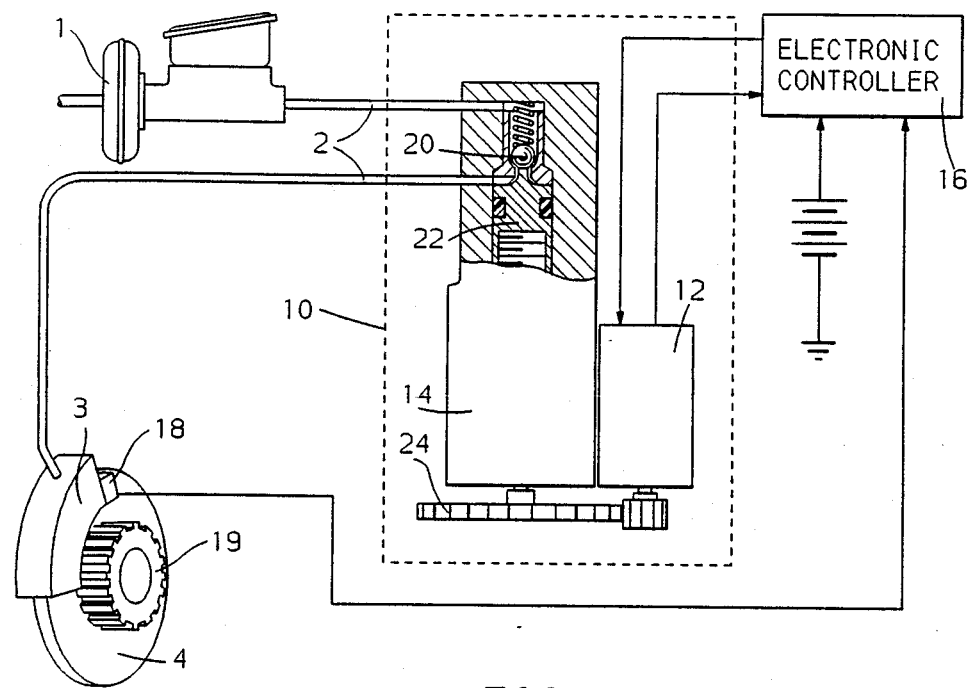
FIG. 1 is a general diagram of a braking system for controlling the brakes in accord with the principles of the invention.

An overview of the preferred embodiment is detailed in FIG. 1. The vehicle braking system is composed of a hydraulic boost unit 1 and brake lines 2 going to the wheel brake, such as a caliper 3 located at the rotor 4, of a vehicle wheel. With the addition of the antilock control system, the total vehicle braking system is comprised of the standard base braking components and (a) an electronic controller 16, (b) a wheel speed sensor assembly 18 mounted at the wheel near (c) an excitor ring 19, and (d) a modulator assembly 10 described by the following mechanical relationships: (1) a DC motor 12 drives a gear train 24, turning a ball screw actuator 14, which is composed of a linear ball screw and nut; (2) as the linear ball screw rotates, the nut is moved either forward or backward; (3) when the DC motor drives the linear ball screw in the apply direction, the nut moves forward and the piston 22 is applied toward the top of travel; (4) the check ball 20 is unseated and held open when the piston 22 is at the top of travel; (5) when the DC motor 12 is reversed, the linear ball screw rotates in the opposite direction and the nut moves backward, allowing the piston 22 to be backdriven by wheel brake pressure; (6) the check ball 20 seats when the piston is allowed to leave the top of travel, effectively isolating the base brake boost 1 from the wheel brake.

The antilock control system in this embodiment is operative at all times while the vehicle is in operation. As the vehicle wheel rotates, the excitor ring 19 rotates, causing the wheel speed sensor 18 to generate a signal proportional to the wheel speed. The signal is sent from the wheel speed sensor 18 to the electronic controller 16 for processing. The ball screw actuator 14, as shown in FIG. 1, is in the passive mode with the check ball 20 held open by the piston 22 at the top of travel. When the driver of the vehicle applies the brakes, with antilock passive, the hydraulic fluid can pass through the brake line 2 past the check ball 20 and through to the wheel brake caliper 3. Thus the antilock system is said to be transparent during normal braking.

The antilock control system detects incipient wheel lockup based upon the parameters of vehicle wheel slip and wheel deceleration. The information from the wheel speed sensor 18 is used by the electronic controller 16 to calculate wheel slip and acceleration. Upon detecting high wheel slip or deceleration, indicative of an incipient wheel lock condition, the controller 16 initiates antilock activity. The electric controller 16 commands the DC motor 12 to reverse the ball screw actuator 14, causing the piston 22 to retract and the check ball 20 to seat, isolating the boost portion 1 of the hydraulics from the wheel brake. As the piston 22 retracts, pressure at the wheel brake is relieved, allowing the wheel to begin to reaccelerate. When the wheel approaches recovery, the controller 16 commands the motor 12 to hold pressure constant, which halts the motion of the piston 22 and allows motor torque and wheel brake pressure to remain equalized. Upon sensing wheel recovery, the controller 16 commands the motor 12 to reapply pressure, causing the ball screw actuator 14 to move forward, applying the piston 22 and returning fluid back to the wheel brake caliper 3. Wheel brake pressure is then increased toward the optimal pressure for the road surface. When the wheel again begins to approach lock, the wheel cycle process is repeated. A wheel cycle is defined as beginning with the detection of incipient lock and the subsequent release of pressure and ending when the pressure has been reapplied to the point just prior to incipient lock. During this wheel cycling process, the power consumed by the electric DC motor 12 while both increasing and holding pressure is directly proportional to the rotational torque exerted by the motor on the gear train 24. The rotational torque is translated through the linear ball screw and nut as a linear force to the head of the piston 22. The pressure present at the piston head is proportional to the wheel brake pressure. Thus, given (a) the equation $W=I^2R$ relating motor power, W, to motor current, I, and resistance, R, and (b) the above mechanical relationships, the current draw, I, of the motor 12 while holding and/or increasing pressure can be considered proportional to the wheel brake pressure, P.

Figure 2:
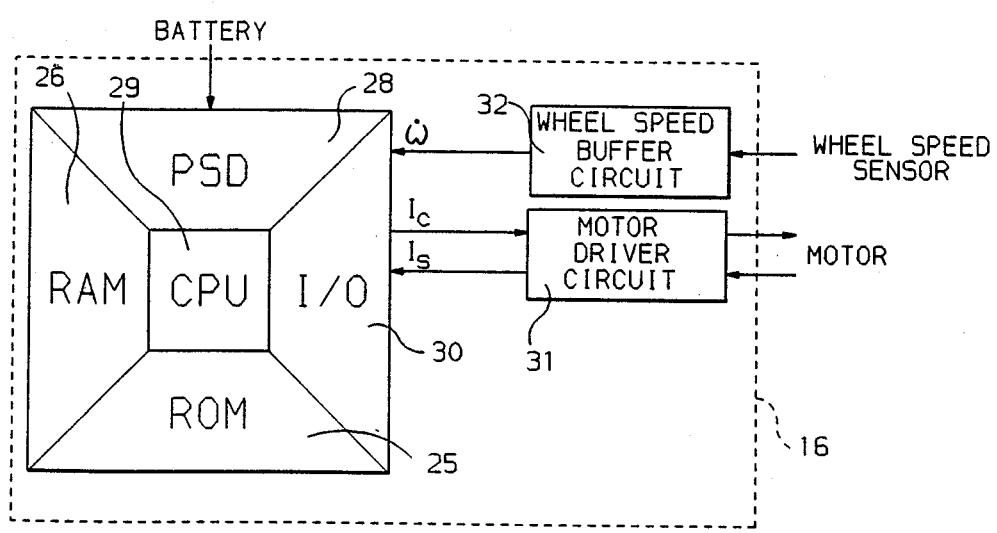
FIG. 2 is a diagram of the electronic controller.

Based on the stated relationship between motor current, I, and wheel brake pressure, P, the electronic controller 16 implements instructions to achieve the desired wheel brake pressure. As shown in FIG. 2, the electronic controller 16 consists of (a) a common digital computer composed of read-only memory (ROM) 25, random access memory (RAM) 26, a power supply device (PSD) 28, an instruction processing architecture embodied in the central processing unit (CPU) 29, and input/output circuitry (I/0) 30 which interface to the (b) motor driver circuit 31 and (c) wheel speed sensor buffer circuit 32.

Figure 3:
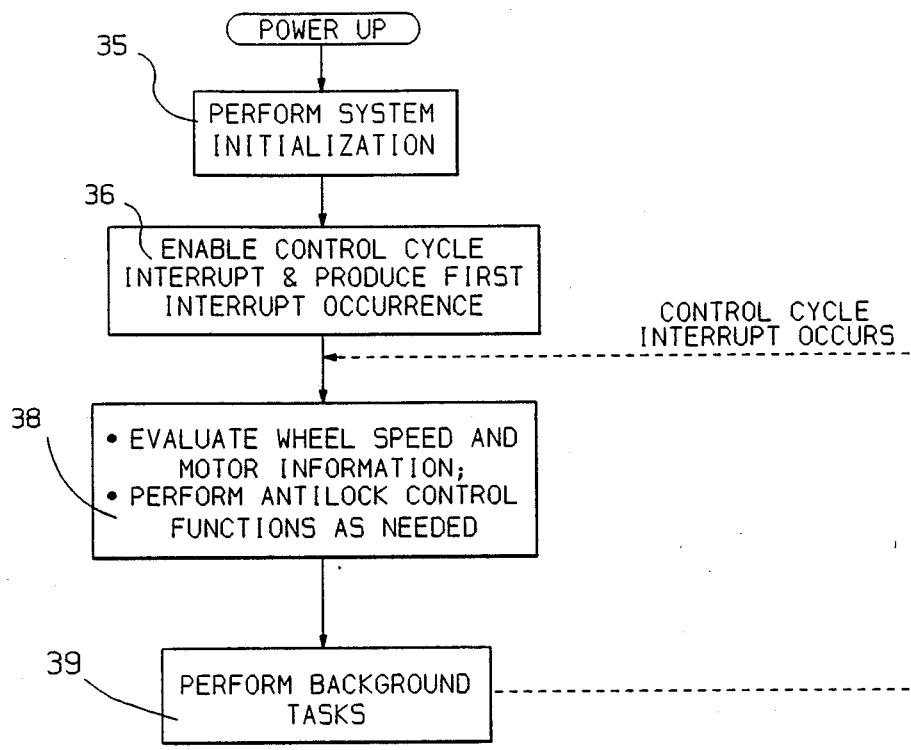
FIGS. 3, 4a and 4b are flow charts detailing the operation of the electronic controller.
Figure 4A:
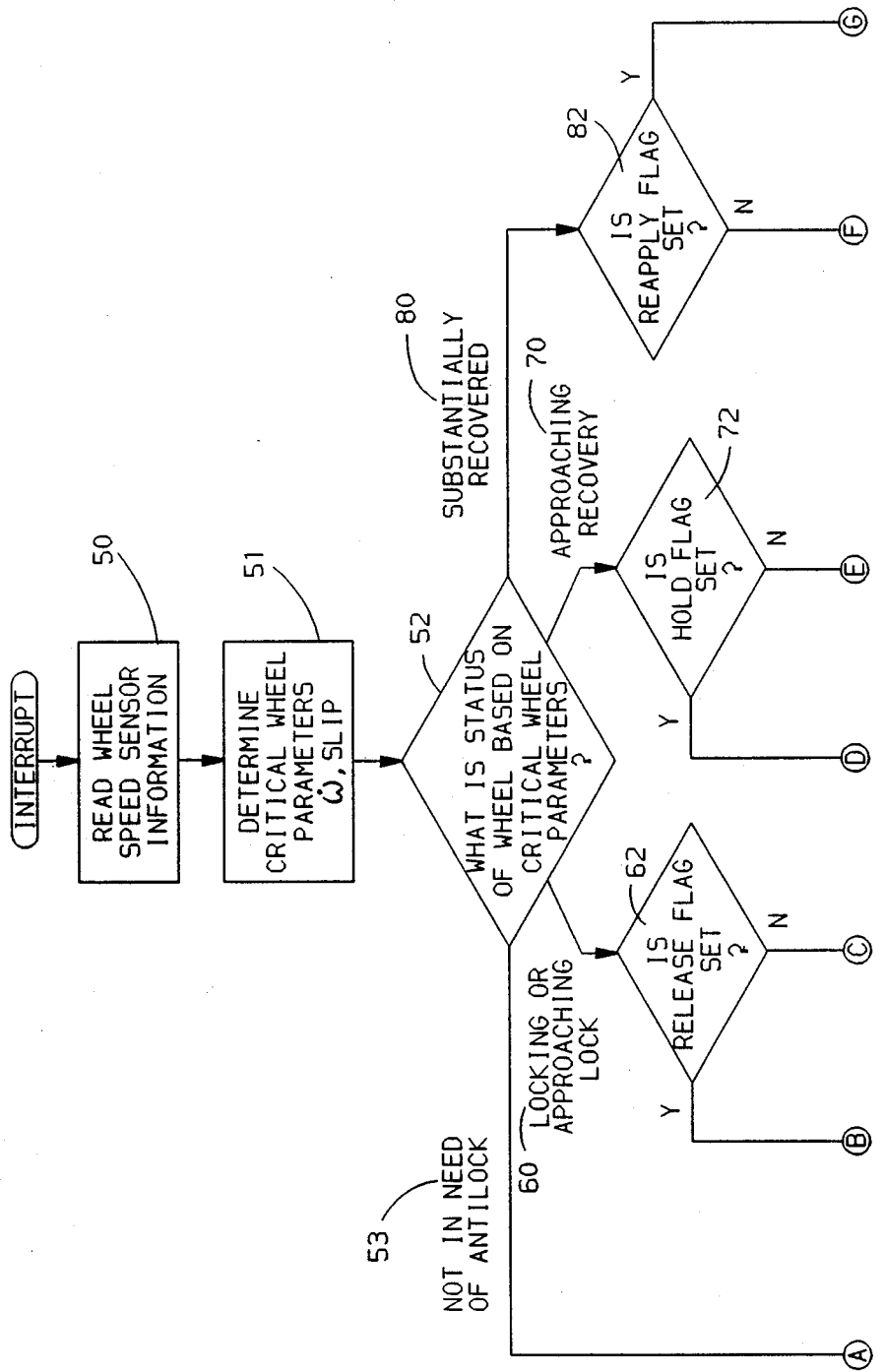
Figure 4B:
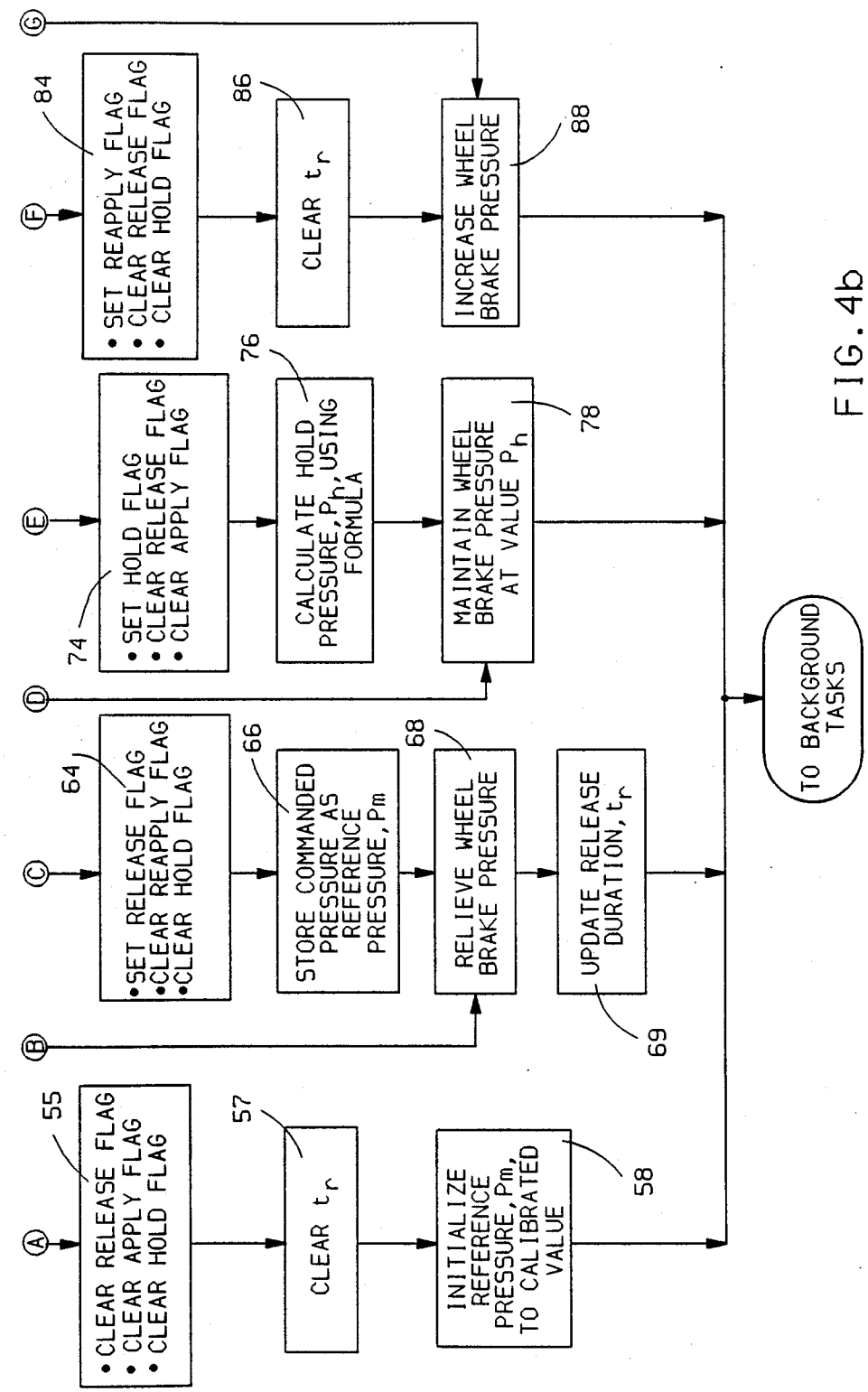

The ROM 25 contains the instructions necessary to implement the algorithm diagrammed in FIGS. 3 and 4. It should be noted that in describing the functions of the algorithm encoded in the ROM, references to tasks which have been detailed as flow diagram function blocks will be designated by <nn>, where nn is the diagram reference number and < > indicates that the concept described by the particular flow diagram function block text is being referenced. The text in the flow diagram function block is intended to describe the general task or process being executed by the controller at that point. The text does not represent the actual ROM instructions. It is recognized that there are a variety of known information-processing languages available to one skilled in the art to construct the actual instructions necessary to accomplish the tasks described by the text in the flow diagram function blocks.

When the antilock system is powered-up, via the vehicle ignition or other means, the controller 16 will begin executing the instructions coded in ROM 25. As shown in FIG. 3, the controller 16 will first perform system initialization <35>, which entails clearing registers, initializing specific RAM variables to calibrated values, stabilizing voltage levels at the I/0 and other basic functions of the digital computer. The system initialization process also includes insuring the linear ball screw actuator 14 is in the passive, or as earlier described, the transparent, mode shown in FIG. 1. The actuator is said to be transparent to the base braking functionality of the vehicle while the check ball 20 is unseated and is held open by the piston 22, allowing hydraulic boost 1 to reach the wheel brake Once the system has been initialized, the controller 16 will enable the control cycle interrupt <36>. The control cycle interrupt provides a means for accurately calculating the critical vehicle parameters of wheel slip and acceleration by insuring that the time between calculations is fixed at a value such as 5 msec. Once a control cycle interrupt has occurred, the controller 16 proceeds through the major loop referred to as the "control cycle". During the control cycle, the controller performs both brake control processing tasks <38> and background tasks <39>. The brake control tasks include: reading and processing the wheel speed and DC motor signal information, determining whether antilock control is necessary, and performing antilock control functions as needed. Whether or not antilock control is required, the controller always evaluates wheel speed and motor signal information. After executing the brake control tasks, the controller proceeds to the background tasks <39>. The background tasks consist of diagnostic self-check activities and communication with off-board devices such as other vehicle controllers or service tools. All of these control cycle tasks are performed once every control cycle interrupt. Upon receiving a control cycle interrupt, the controller executes the brake control functions <38> and background tasks <39>. Thus, every control cycle, the controller evaluates the need for antilock activities, performs these activities as needed, and carries out diagnostic and off-board communications activities.

Figure 5:
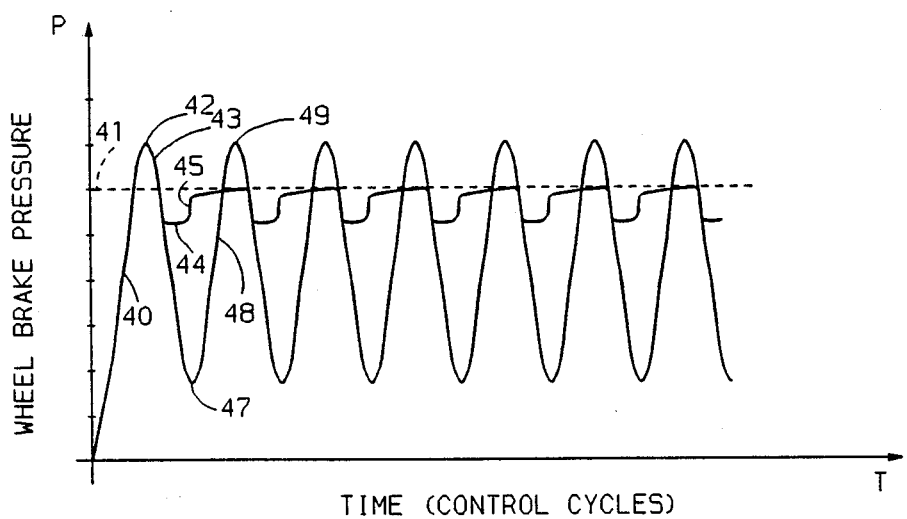
FIG. 5 is an illustration of wheel brake pressure in response to the operation of the electronic controller.

Turning now to FIG. 4, the steps necessary to implement the general brake control functions <38> are detailed. Additionally, FIG. 5 diagrams the resultant wheel brake pressure produced by the antilock control system. When the driver of the vehicle begins braking, fluid is applied to the wheel brake. As the wheel brake pressure increases, illustrated at 40, the wheel begins to decelerate. As explained earlier, the controller 16 is operative at all times, and executes the instructions, encoded in ROM, within the confines of the control cycle interrupt. Thus, the controller 16, upon receiving a control cycle interrupt, proceeds to read the wheel speed sensor information <50> and calculate the critical parameters of wheel slip and acceleration <51>. While the wheel brake pressure is at a value substantially below the ideal pressure for the road surface, indicated as pressure level 41, the status of the critical parameters <52> will indicate antilock control is not necessary <53>. The controller subsequently clears the release, hold and reapply flags <55>, clears the release duration counter, $t_r$<57>, and initializes the reference pressure value, $P_m$, to a calibrated value <58>. The controller continues the control cycle, proceeding to the background tasks. Since no antilock activities were initiated, the actuator remains in the transparent mode. Given that the driver of the vehicle continues to apply the brakes, wheel brake pressure increases toward, and soon surpasses, the ideal pressure for the road surface. This phenomenon is depicted in FIG. 5 by pressure 42 which is greater than pressure level 41.

Once wheel brake pressure exceeds the ideal pressure for the road surface, the wheel rapidly approaches lock. With the beginning of the control cycle, the controller again reads the wheel speed information <50>, calculates wheel slip and acceleration <51>, and evaluates the status of the critical parameters <52>. At this point, the critical parameters indicate an incipient lock condition <60>. Having determined to initiate antilock activities, the controller first evaluates the status of the release flag <62>, which, based upon the prior control cycle activity, is clear. Note that whenever the release flag is clear, it is indicating that the system was not performing a release during the prior control cycle. Similarly, whenever the reapply or hold flags are clear, it is indicating that a reapply or hold, respectively, were not being performed during the prior control cycle. Keeping with the purpose of these flags, the release flag is set and the reapply and hold flags are cleared <64>. Having determined that the wheel is approaching lock and that the system was not already performing a release, the controller stores the most recent commanded pressure, $P_m$, which is the reference pressure <66>. This reference pressure is the maximum wheel brake pressure achieved during the wheel cycle, and represents the pressure required to produce incipient wheel lock. Due to the mechanical relationships previously related, the wheel brake pressure while increasing and/or holding pressure is proportional to the motor current. The motor current draw, $I_s$, as sensed by the controller 16 through the motor driver circuit 31, can be considered representative of actual wheel brake pressure, $P_m$, and is stored as such.

It should be reiterated that in this embodiment, the actuator is in the transparent mode prior to initiating antilock activities. Due to this feature, a calibrated value has been stored as $P_m$ for this first wheel cycle. The calibrated value for $P_m$ was established during the previous control cycle when antilock control activity was not required (flow diagram path <52>-<53>-<55>-<57>-<58>) During later wheel cycles, i.e. after the initiation of antilock activities, the actuator is no longer transparent. Referring to the earlier description of the modulator 10, the DC motor 12 will now be driving the actuator 14. Thus the actual value of $I_s$, rather than a calibrated value, is stored in $P_m$ during later wheel cycles.

Returning to the description of the path <52>-<60>-<62>-<64>-<66>, the controller 16 commands the actuator to release wheel brake pressure <68>. This is accomplished by rotating the motor 12 in the reverse direction, which retracts the piston 22, seats the check ball 20, isolates the wheel brake from the boost 1 and relieves pressure at the wheel brake. The resulting release of wheel brake pressure is diagrammed in FIG. 5 as the decreasing pressure rate 43. By releasing pressure, the system checks the incipient lock condition and allows the wheel to begin reaccelerating. The controller 16 also begins timing the duration of the release, thereby updating the release duration counter, $t_r$ <69>. The controller completes the control cycle by proceeding to execute the background tasks.

Governed by the control cycle interrupt, the controller continues to read wheel speed information <50>, calculate critical wheel parameters <51>, and evaluate the status of the critical parameters <52> every interrupt control cycle. While the wheel is still tending to lock <60>, the release flag remains set (as it was set during the first time through this path) and the controller proceeds from determining the status of the release flag <62> directly to relieving wheel brake pressure <68>. It should be noted that while releasing pressure, the mechanical relationship between motor current, $I_s$, and wheel brake pressure, P, does not hold true. Thus, the stored value of $P_m$ is not disturbed. The controller continues to update the release duration counter, $t_r$ <69>.

As the wheel continues to reaccelerate, it will begin approaching recovery. With the beginning of another control cycle, the controller 16 again reads the wheel speed information <50>, calculates <51> and evaluates <52> the critical wheel parameters, and determines that the wheel is indeed approaching recovery <70>. In general, this condition can be broadly characterized by a high reacceleration and/or wheel slip decreasing to a value that is nominally above the critical slip value. Proceeding along this flow path, the controller 16 first evaluates the status of the hold flag <72>. Given that the system was not performing a hold during the previous control cycle, the flag will be clear <72>. Subsequently, the hold flag is set and the release and reapply flags are cleared <74>. Next, utilizing the reference pressure, $P_m$, and the release duration counter, $t_r$, the hold pressure value is calculated <76> using the following formula:

$$P_h = (t_{max} - t_r) * P_m * F_{compliance}$$

where $t_{max}$ is a value calibrated to represent the amount of time it would take to release wheel brake pressure to zero, and $F_{compliance}$ is a value calibrated to adjust for the compliance characteristics of the braking system. By multiplying out the terms, it can be seen that $t_{max}*P_m$ indicates the release of 100% of the pressure, while $t_r*P_m$ estimates the amount of pressure relieved. Thus $(t_{max}-t_r)*P_m$ estimates the amount of pressure remaining at the wheel brake. The compliance factoring term, $F_{compliance}$, allows for the compensation of wheel brake compliance, and can be set to a variety of values. In this embodiment, which utilizes a caliper wheel brake, the value can be set to approximately 50%. Thus, the calculated hold pressure, $P_h$, utilizing a compliance factor of 50%, would yield a value between 50% and 0% of the reference pressure. The DC motor 12 is commanded to generate the torque necessary to produce and maintain $P_h$ <78>. The resultant wheel brake pressure is depicted as pressure level 44 on FIG. 4. If the controller did not calculate the hold pressure and instead continued to release pressure while the wheel is approaching recovery but still operating in the unstable region, the wheel brake pressure would fall to level 47. By using the hold pressure, the wheel is allowed to continue reaccelerating and approaching recovery, without unnecessarily releasing pressure.

Having continued to reaccelerate, the wheel will eventually return to the stable operating region, and is said to be "recovered". With the beginning of another control cycle, the controller proceeds, as usual, through steps <50>, <51> and <52>, and determines that the critical parameters indicate the wheel is now substantially recovered <80>. This condition is typified by having wheel slip below the critical slip value. The controller next evaluates the status of the reapply flag <82>, which, based upon the prior control cycle activity, is clear. Keeping with the purpose of the reapply, hold and release flags, the reapply flag is set and the hold and release flags are cleared <84>. The release duration counter, $t_r$, is also cleared <86> to indicate a release is no longer in progress. Since the wheel has recovered, pressure can be reapplied to the wheel brake <88>. The controller initiates the reapply by commanding the motor to produce the torque necessary to achieve a significant fraction of the previously stored reference pressure, $P_m$. As related during the background discussion, braking efficiency is maximized by striving to brake at or near the pressure required to produce critical wheel slip. The initial reapply begins from the hold pressure 44 and proceeds rapidly to a significant fraction of $P_m$. During subsequent control cycles, while the wheel is still operating in the stable braking region, the controller proceeds along the flow path <50>-<51>-<52>-<80>-<82> directly to <88>, as the reapply flag has been set. Once reaching a significant fraction of the reference pressure, the motor torque increases slowly, which gradually increases pressure. The characteristic of the reapply is shown in FIG. 5 as pressure profile 45. After pressure has been substantially increased, the wheel will cease to recover and begin to approach lock, repeating the wheel cycle process.

If the controller did not calculate a hold pressure, and instead continued releasing to pressure level 47, the linear screw actuator would become over-excited. As related earlier, this is because the initially commanded reapply pressure, which is a significant fraction of the reference pressure, would be significantly greater than the pressure remaining at the wheel brake. Since the motor torque being commanded greatly exceeds the existing wheel brake pressure, the linear screw actuator is over-excited, the piston subsequently travels at a high speed, and the system rapidly overshoots the desired pressure. Such an uncontrolled pressure increase is depicted by pressure slope 48. This phenomenon results in the wheel brake pressure exceeding the pressure required to produce critical wheel slip, as depicted by pressure level 49. Because the critical slip has been exceeded, the wheel is quickly driven into a lock condition. By allowing wheel brake pressure to fluctuate so dramatically, braking efficiency is decreased and stopping distance is increased. In contrast, by utilizing the hold state, brake pressure oscillates closer to the pressure required to produce the critical wheel slip without over-shooting the desired pressure, thereby achieving greater braking efficiency.

The foregoing description of a preferred embodiment for the purpose of illustrating the principles of this invention is not to be considered as limiting or restricting the invention since many modifications may be made by the exercise of skill in the art without departing from the scope of the invention.

The embodiments of the invention in which an exclusive property or privilege is claimed are defined as follows:

1. A wheel lock control system for limiting a pressure applied to a brake of a vehicle wheel traveling over a road surface, the system comprising:

means for detecting an incipient wheel lock condition;

means for storing a value of brake pressure at which the incipient wheel lock condition occurred;

means for relieving wheel brake pressure to alleviate the incipient wheel lock condition;

means for measuring an elapsed time while wheel brake pressure is being relieved;

means for detecting a first condition in which the wheel is approaching recovery from the lock condition;

means responsive to a detected first condition for calculating a value of wheel brake pressure corresponding to an amount of pressure remaining at the wheel brake after having relieved wheel brake pressure for the measured elapsed time by (a) multiplying the stored value of brake pressure by the elapsed time to approximate an amount of pressure having been relieved from the wheel brake during the measured elapsed time, (b) multiplying the stored pressure value by a calibrated amount to arrive at a value representative of all pressure having been relieved from the wheel brake, and (c) subtracting (1) the approximated amount of pressure relieved from (2) the value representative of all pressure having been relieved to arrive at a calculated value of pressure remaining at the wheel brake;

means for controlling the wheel brake pressure constant at the calculated value of pressure remaining at the wheel brake while the wheel is approaching recovery;

means for detecting a second condition in which the wheel has recovered from the incipient lock condition;

means for increasing wheel brake pressure in response to the detected recovery to a value which is a substantial fraction of the stored pressure value; and means for increasing wheel brake pressure gradually from the significant fraction of the stored pressure value until an incipient wheel lock condition is again detected.

2. A wheel lock control system for limiting a pressure applied to a brake of a vehicle wheel traveling over a road surface, the system comprising:

means for detecting an incipient wheel lock condition;

means for storing a value of brake pressure at which the incipient wheel lock condition occurred;

means for relieving wheel brake pressure to alleviate the incipient wheel lock condition;

means for measuring an elapsed time while wheel brake pressure is being relieved;

means for detecting a first condition in which the wheel is approaching recovery from the lock condition;

means responsive to a detected first condition for calculating a value of wheel brake pressure corresponding to an amount of pressure remaining at the wheel brake after having relieved wheel brake pressure for the measured elapsed time in accord with the expression $P_h = (t_{max} - t_r) * P_m$ where $t_{max}$ is a calibration time value indicative of the time required to relieve all pressure at the wheel brake, $t_r$ is the measured elapsed time at the time the first condition is detected, and $P_m$ is the stored pressure value;

means for controlling the wheel brake pressure constant at the calculated value of pressure remaining at the wheel brake while the wheel is approaching recovery;

means for detecting a second condition in which the wheel has recovered from the incipient lock condition;

means for increasing wheel brake pressure in response to the detected recovery to a value which is a substantial fraction of the stored pressure value; and means for increasing wheel brake pressure gradually from the significant fraction of the stored pressure value until an incipient wheel lock condition is again detected.

3. A wheel lock control system for limiting the brake pressure applied to a brake of a vehicle wheel traveling over a road surface, the system comprising, in combination:

a brake pressure modulator including a motor for modulating the brake pressure applied to the brake of the wheel in response to motor current, the motor current being a measure of brake pressure when controlled to either hold or increase brake pressure;

means for detecting an incipient wheel lock condition;

means for storing a value of the brake pressure as represented by motor current at which the incipient wheel lock condition is initiated;

means for controlling the motor current to release brake pressure in response to the detected incipient wheel lock condition to allow wheel recovery from the incipient wheel lock condition, the motor current during release of the brake pressure having an unknown relationship to the brake pressure;

means for detecting a first recovery condition at which the wheel is approaching recovery from the incipient wheel lock condition resulting from the lowering of the brake pressure;

means for detecting a second recovery condition at which the wheel is recovered from the incipient wheel lock condition;

means for measuring an elapsed time from an initial time of the releasing of the brake pressure in response to the detected incipient wheel lock condition to a time at which the first recovery condition is detected;

means responsive to the detection of the first recovery condition for (a) determining an estimated value of motor current corresponding to the brake pressure at which the first recovery condition is detected in accord with a predetermined function of the measured elapsed time and the stored value of the brake pressure and (b) controlling the motor current equal to the estimated value of motor current to establish the brake pressure at which the first recovery condition is detected; and means responsive to the detected second recovery condition for increasing the motor current to increase the brake pressure.

4. A wheel lock control method for a vehicle having a braking system including a motor driven brake pressure modulator for modulating the brake pressure applied to a brake of a vehicle wheel traveling over a road surface in response to motor current, the motor current being a measure of brake pressure when controlled to either hold or increase brake pressure, the method comprising the steps of:

detecting an incipient wheel lock condition;

storing a value of the brake pressure as represented by motor current at which the incipient wheel lock condition is initiated;

controlling the motor current to release brake pressure in response to the detected incipient wheel lock condition to allow wheel recovery from the incipient wheel lock condition, the motor current during release of the brake pressure having an unknown relationship to the brake pressure;

detecting a first recovery condition at which the wheel is approaching recovery from the incipient wheel lock condition resulting from the lowering of the brake pressure;

detecting a second recovery condition at which the wheel is recovered from the incipient wheel lock condition;

measuring an elapsed time from an initial time of the releasing of the brake pressure in response to the detected incipient wheel lock condition to a time at which the first recovery condition is detected;

determining an estimated value of motor current corresponding to the brake pressure at which the first recovery condition is detected in accord with a predetermined function of the measured elapsed time and the stored value of the brake pressure;

controlling the motor current equal to the estimated value of motor current to establish the brake pressure at which the first recovery condition is detected; and increasing the motor current to increase the brake pressure in response to the detected second recovery condition.

* * * * *